United States Patent
Ishida

(10) Patent No.: US 6,264,465 B1
(45) Date of Patent: Jul. 24, 2001

(54) COMBUSTION DEVICE

(75) Inventor: Michio Ishida, Osaka (JP)

(73) Assignee: Hitachi Zosen Corporation, Osaka (JP)

(*) Notice: Subject to any disclaimer, the term of this patent is extended or adjusted under 35 U.S.C. 154(b) by 0 days.

(21) Appl. No.: 09/380,827

(22) PCT Filed: Mar. 6, 1998

(86) PCT No.: PCT/JP98/00948

§ 371 Date: Sep. 10, 1999

§ 102(e) Date: Sep. 10, 1999

(87) PCT Pub. No.: WO98/40672

PCT Pub. Date: Sep. 17, 1998

(30) Foreign Application Priority Data

Mar. 13, 1997 (JP) .................................................. 9-058880

(51) Int. Cl.[7] ................................................ F27B 15/12
(52) U.S. Cl. ............................... 432/58; 432/15; 432/16; 122/4 D; 122/412
(58) Field of Search ............................ 432/14, 15, 58, 432/106, 16; 122/4 D, 412, 467, 468, 485, 487, 489; 110/347, 345, 245

(56) References Cited

U.S. PATENT DOCUMENTS

| | | |
|---|---|---|
| 4,311,670 | 1/1982 | Nieminen et al. . |
| 4,616,576 * | 10/1986 | Engstrom et al. ........................ 432/58 |
| 4,676,824 * | 6/1987 | Daradimos et al. ................... 432/106 |
| 5,069,171 * | 12/1991 | Hansen et al. ........................... 432/58 |
| 5,363,812 * | 11/1994 | Belin et al. ............................ 122/4 D |
| 5,620,488 * | 4/1997 | Hirayama et al. .................... 122/4 D |

FOREIGN PATENT DOCUMENTS

| | | |
|---|---|---|
| 0 434 945 A2 | 7/1991 | (EP) . |
| 0 747 462 A1 | 12/1996 | (EP) . |

* cited by examiner

*Primary Examiner*—Gregory Wilson
(74) *Attorney, Agent, or Firm*—Armstrong, Westerman, Hattori, McLeland & Naughton, LLP

(57) ABSTRACT

A combustion apparatus for use as a boiler wherein RDF is burned as the fuel, or as an incinerator for burning municipal waste. The apparatus is diminished in the quantities of NOx produced, permits a dust collector to achieve an improved efficiency in separating off a free-flowing medium and assures a fluidized-bed furnace of effective fluidization of a medium. The apparatus comprises a fluidized-bed furnace (1), a cyclone (2) disposed downstream from the furnace (1) for separating a free-flowing medium and a combustion residue discharged from the furnace (1) from combustion gases and collecting these solids, and a medium-residue return channel (3) provided between the cyclone (2) and the furnace (1) for returning the free-flowing medium and the combustion residue collected by the cyclone (2) to the furnace (1) therethrough. A secondary combustion furnace (31) is disposed downstream from the cyclone (2) for completely burning unburned combustibles in the combustion gases egressing from the cyclone (2) by introducing air into the combustion furnace. A heat recovery unit (12) is provided at an intermediate portion of the return channel (3).

3 Claims, 3 Drawing Sheets

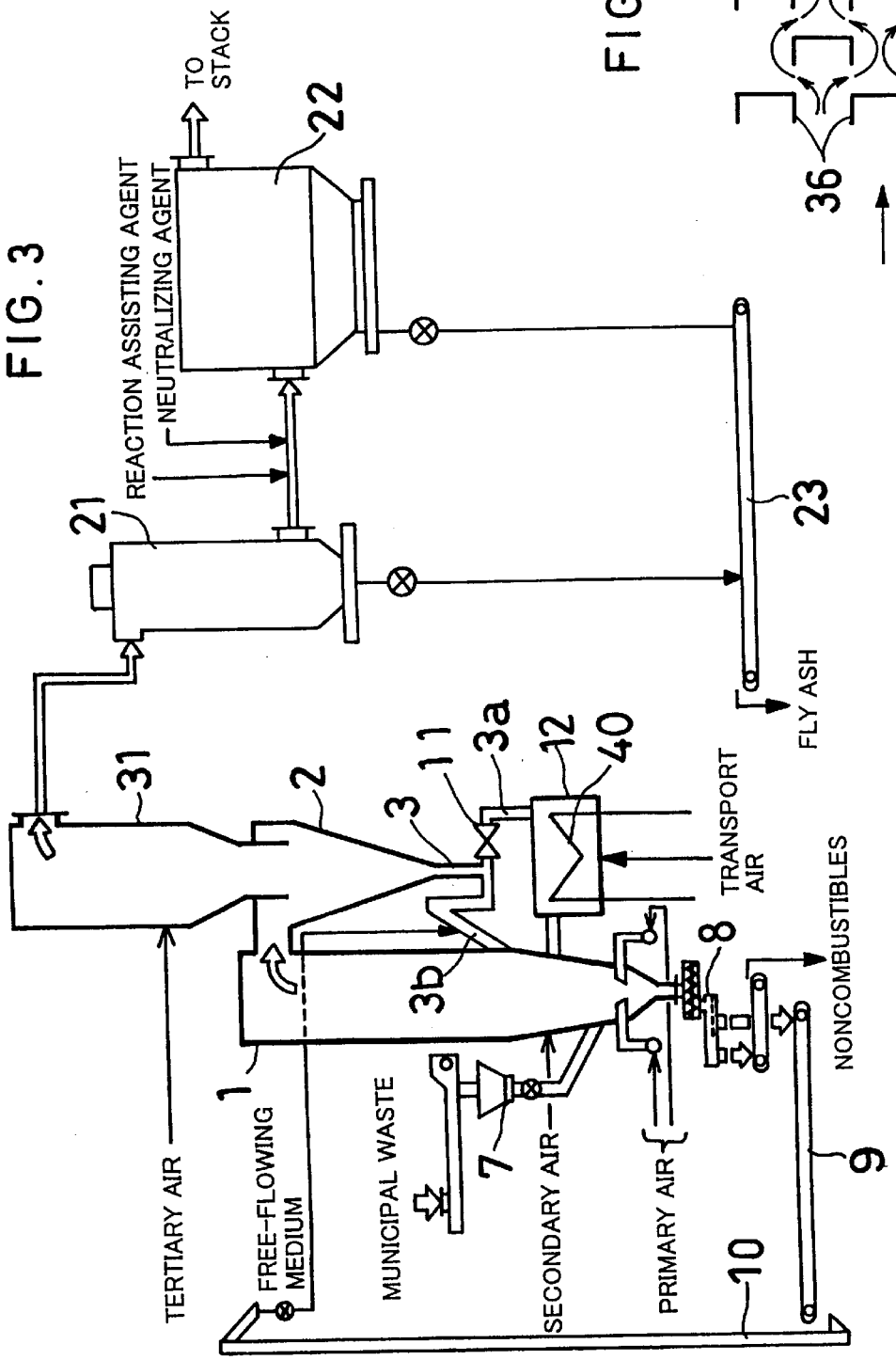

COMBUSTION DEVICE

FIELD OF THE INVENTION

The present invention relates to combustion apparatus for use as boilers wherein refuse-derived fuel (hereinafter referred to as "RDF") is used as the fuel for incinerators for burning municipal waste.

BACKGROUND ART

FIG. 4 shows a combustion apparatus conventionally utilized as a boiler wherein RDF is used as its fuel.

With reference to FIG. 4, the combustion apparatus comprises a fluidized-bed furnace 1, a cyclone 2 (dust collector) disposed downstream from the furnace 1 for separating a free-flowing medium and a combustion residue discharged from the furnace 1 from combustion gases and collecting these solids, and a medium-residue return channel 3 provided between the cyclone 2 and the fluidized-bed furnace 1 for returning the free-flowing medium and the combustion residue collected by the cyclone 2 to the furnace 1 therethrough.

The fluidized-bed furnace 1 forms a fluidized bed from sand, or like free-flowing medium respectfully with primary air and secondary air sent from an air preheater. A multiplicity of water tubes (not shown) for a boiler are arranged within the furnace 1 to cover the inner peripheral surface thereof. These water tubes communicate at their upper ends with a steam drum 6 via an unillustrated header. RDF is supplied from an unillustrated scale conveyor to a hopper 7 in portions of predetermined quantity and placed into the fluidized-bed furnace 1 from the hopper 7. Noncombustibles and free-flowing medium are drawn off from the lower end of the furnace 1 and separated by a separator 8 disposed below the furnace 1, and the noncombustibles are discharged from the system, while the medium is returned to the furnace 1 by a conveyor 9 and an elevator 10.

The medium-residue return channel 3 is bifurcated into two branches at an intermediate portion thereof. One of the branches, 3a, is provided at intermediate portions thereof with a flow control valve 11 and a heat recovery unit 12 which are arranged in this order downstream from the cyclone 2. A superheater 13 for the boiler is disposed in the heat recovery unit 12. Medium transport air is forced into the heat recovery unit 12. The forward end of the other branch 3b is opened to the fluidized-bed furnace 1 at a position above the position here the hopper 7 is opened to the furnace. The free-flowing medium transported by the conveyor 9 and the elevator 10 is admitted into the branch 3b at an intermediate portion thereof.

A heat recovery column 14 is disposed downstream from the cyclone 2. This column 14 has in its interior a first flue 15 for passing combustion gases, discharged from the cyclone 2, from above downward therethrough, and a second flue 16 in communication with the lower end of the first flue 15 for passing the combustion gases from below upward therethrough. The inner peripheral surface of the first flue 15 is covered with a multiplicity of boiler water tubes (not shown), the upper ends of which also communicate with the steam drum 6 via an unillustrated header. Arranged within the second flue 16 are a boiler economizer 17 for passing therethrough water forwarded from a deaerator, and two superheaters 18, 19 connected in series with the superheater 13 in the heat recovery unit 12 for passing steam sent from the steam drum 6. A water injector 20 for adjusting the temperature and pressure of the steam by injecting water is disposed between the two superheaters 18, 19 within the second flue 16, also between the lower superheater 19 in the flue 16 and the superheater 13 in the heat recovery unit 12.

A temperature reduction column 21 and a bag filter 22 are arranged downstream from the heat recovery column 14. The combustion gases passing through the heat recovery column 14 are further reduced in temperature by the heat reduction column 21. The bag filter 22 serves to collect hydrogen chloride, sulfur oxides, soot and dust from the combustion gases. Slaked lime, or like neutralizing agent, and a reaction assisting agent, are added to the combustion gases at a position upstream from the filter. After passing through the bag filter 22, the combustion gases are released into the atmosphere through a stack.

Fly ash is discharged from the lower ends of the heat recovery column 14, temperature reduction column 21 and bag filter 22 and sent to a fly ash treating unit (not shown).

With the combustion apparatus thus constructed, RDF is sent into the fluidized-bed furnace 1 by the hopper 7. In the furnace 1, the free-flowing medium is formed into a fluidized bed with primary air and secondary air, and RDF is burned in the fluidized bed. The unburned combustibles are almost completely burned until the combustion gases and the medium enter the cyclone 2 from the upper end of the furnace 1. The medium and combustion residue discharged from the furnace 1 are separated from the combustion gases and trapped in the cyclone 2, passed through the two branches 3a, 3b of the return channel 3 and returned to the furnace 1. While passing through the branch 3a having the heat recovery unit 12, the medium and the residue have their heat transferred to steam flowing through the superheater 13, whereby the steam is superheated. The temperature of the furnace 1 can be lowered by adjusting the amount of medium transport air to be forced in and the opening degree of the flow control valve 11 and thereby increasing the quantities of medium and residue to be passed through the branch 3a having the heat recovery unit 12. Conversely, the temperature of the furnace 1 can be raised by reducing the quantities of medium and residue to be passed through the branch 3a having the heat recovery unit 12.

The combustion gases flowing out of the cyclone 2 enter the heat recovery column 14, flow down the first flue 15 first and consequently have their heat transferred to boiler water in the water tubes providing the wall of the flue, whereby the boiler water in the water tubes is heated and evaporated, and the temperature of the combustion gases is lowered. The combustion gases then flow upward through the second flue 16 and have their heat transferred to the boiler water in the water tubes constituting the wall of the flue, to the steam in the two superheaters 19, 18 and to the water in the economizer 17, whereby the boiler water in the water tubes is heated and evaporated, the steam is superheated, and the water in the economizer 17 is preheated to result in a drop in the temperature of the combustion gases.

The combustion gases subsequently flow into the temperature reduction column 21 and have their temperature further reduced. Slaked lime, or like neutralizing agent, and a reaction assisting agent, are thereafter added to the combustion gases, and the resulting mixture is led into the bag filter 22, in which hydrogen chloride, sulfur oxides, soot and dust are removed. The gases separated off are then released into the atmosphere.

On the other hand, the water sent from the deaerator and preheated during passage through the economizer 17 is admitted into the steam drum 6 and thereafter further heated within the water tubes of the fluidized-bed furnace 1 and the heat recovery column 14 constituting a boiler water circulation circuit to become a steam-water mixture, which is then sent to the steam drum 6 again. The steam is separated off in the steam drum 6, passed through the three superheaters 18, 19, 13 in succession and superheated with the heat of the combustion gases during passage through the superheaters 18, 19 and with the heat of the free-flowing medium during passage through the superheater 13. The superheated steam is sent to a steam turbine.

However, the conventional combustion apparatus has the problem that almost complete combustion of RDF in the fluidized furnace 1 increases the internal temperature of the furnace 1 to a considerably high level and necessitates supply of secondary air at a high rate to result in the presence of a large amount of oxygen, consequently producing large quantities of NOx with the nitrogen contained in RDF and the nitrogen afforded by the air. Further, since the combustion gases flowing into the cyclone 2 have a considerably high temperature, for example, of at least about 800° C., the apparatus has another problem that the ash resulting from incineration and contained in the gases is partly melted and adheres to the cyclone 2 to entail an impaired medium separation efficiency. Another problem is also encountered in that the molten ash adheres to the free-flowing medium, causing faulty fluidization in the furnace 1. An attempt to reduce the temperature of the furnace 1 to preclude these problems will entail the problem of giving rise to incomplete combustion to produce increased amounts of unburned combustibles.

An object of the present invention is to overcome the foregoing problems and to provide a combustion apparatus which is diminished in the quantities of NOx produced, further permitting a cyclone, or like dust collector, to achieve an improved efficiency in separating off a free-flowing medium and assuring a fluidized-bed furnace of effective fluidization.

DISCLOSURE OF THE INVENTION

The present invention provides a combustion apparatus comprising a fluidized-bed furnace, a dust collector disposed downstream from the furnace for separating a free-flowing medium and a combustion residue discharged from the furnace from combustion gases and collecting the medium and the residue, a medium-residue return channel provided between the dust collector and the fluidized-bed furnace for returning the free-flowing medium and the combustion residue collected by the dust collector to the furnace therethrough, and a secondary combustion furnace disposed downstream from the dust collector for completely burning unburned combustibles in the combustion gases egressing from the dust collector by introducing air into the combustion furnace.

When the apparatus is thus constructed, the portion of combustibles left incompletely burned in the fluidized-bed furnace and contained in the combustion gases from the dust collector can be completely burned in the secondary combustion furnace in the presence of air introduced therein. This makes it possible to give a relatively low internal temperature to the fluidized-bed furnace and to reduce the rate of supply of oxygen, consequently permitting formation of smaller quantities of NOx than in the conventional apparatus. Since the fuel is not completely burned in the fluidized-bed furnace, the combustion gases flowing into the dust collector have a relatively low temperature, preventing incineration ash from melting in the dust collector and consequently enabling the dust collector to separate the free-flowing medium from the combustion gases with a higher efficiency than in the conventional apparatus.

Because molten incineration ash is unlikely to adhere to the medium, faulty fluidization within the fluidized-bed furnace is avoidable. The unburned combustibles contained in the combustion gases from the dust collector can further be burned completely in the secondary combustion furnace.

The combustion apparatus of the present invention may further comprise a heat recovery unit disposed at an intermediate portion of the medium-residue return channel for recovering heat from the free-flowing medium and combustion residue trapped in the dust collector.

Heat can then be recovered from the heated medium and combustion residue for effective use.

Preferably, the heat recovery unit is, for example, a superheater for a boiler.

In this case, the free-flowing medium and combustion residue in the fluidized-bed furnace flow into the dust collector along with the combustion gases, and the residue is retained in the collector for a sufficient period of time before it is returned as separated from the gases to the fluidized-bed furnace, whereby the residue is dechlorinated. This precludes high-temperature corrosion of the superheater due to the presence of chlorine.

BRIEF DESCRIPTION OF THE DRAWINGS

FIG. 2 is a fragmentary diagram in horizontal section showing a modified dust collector as a substitute for a cyclone;

FIG. 3 is a diagram showing the overall construction of a combustion apparatus of the invention for use as an incinerator for burning municipal waste.

BEST MODE OF CARRYING OUT THE INVENTION

The best mode of carrying out the invention will be described below with reference to the drawings.

Figure 1:
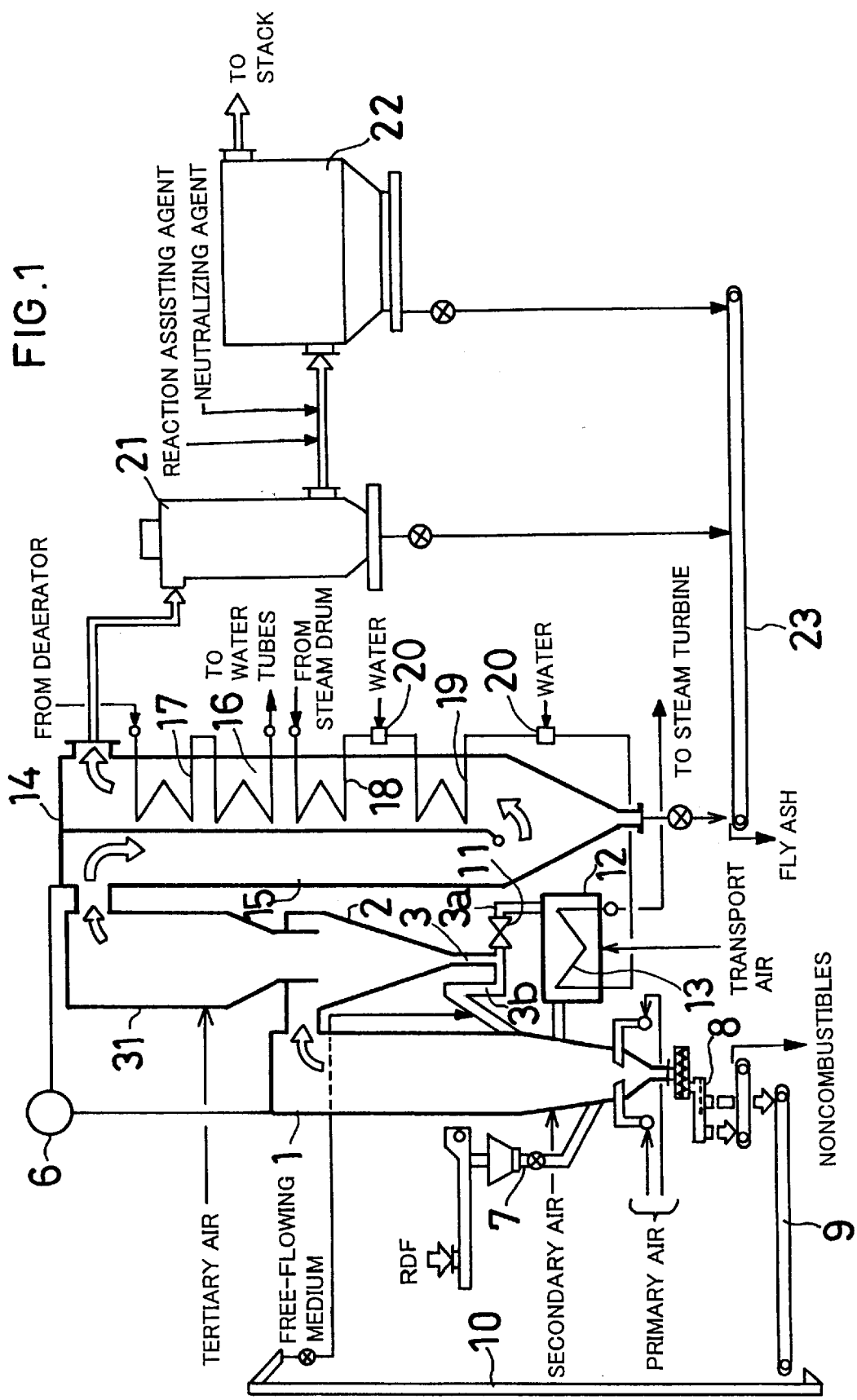
FIG. 1 is a diagram showing the overall construction of a combustion apparatus of the invention for use as a boiler wherein RDF is used as the fuel.
Figure 4:
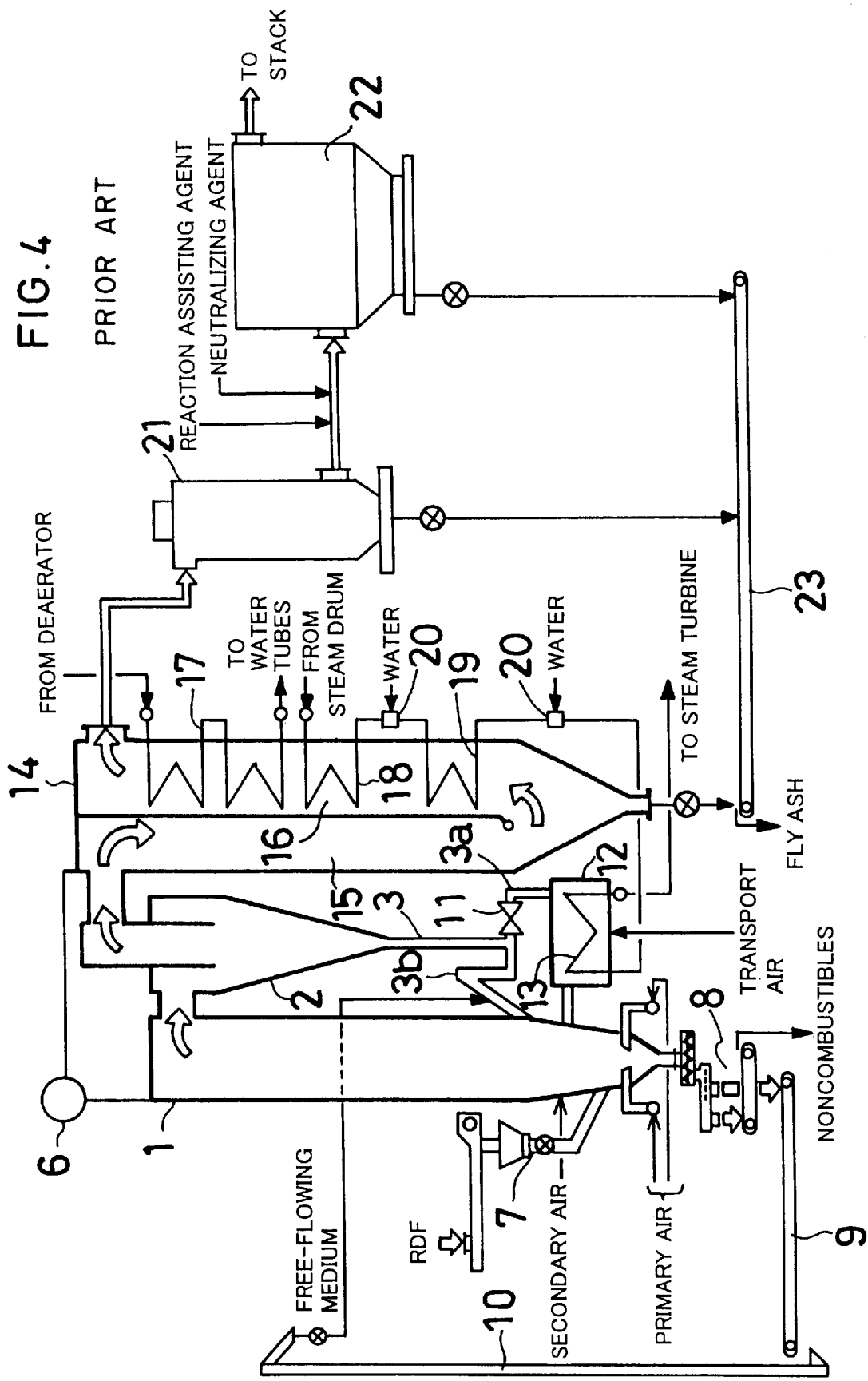
FIG. 4 is a diagram showing the overall construction of a conventional combustion apparatus for use as a boiler wherein RDF is used as the fuel.

FIG. 1 shows the overall construction of a combustion apparatus of the invention for use as a boiler wherein RDF is used as the fuel. In FIGS. 1 and 4, like parts are designated by like reference numerals and will not be described repeatedly.

The fluidized-bed furnace 1 of the combustion apparatus shown in FIG. 1 does not have as large a space as in the apparatus of FIG. 4 but is basically the same as that of FIG. 4 in construction. However, the combustion apparatus comprises a secondary combustion furnace 31 disposed downstream from the cyclone 2 and upstream from the heat recovery column 14. The secondary combustion furnace 31 is supplied with tertiary air and completely burns the unburned combustibles in the combustion gases delivered from the fluidized-bed furnace 1 via the cyclone 2. With the exception of this feature, the apparatus is the same as the one shown in FIG. 4.

RDF is placed by the hopper 7 into the fluidized-bed furnace 1 of the combustion apparatus thus constructed and burned in the fluidized bed within the furnace 1 as is the case with the apparatus of FIG. 4.

The fuel is burned in the furnace 1 at a smaller rate of supply of secondary air than when it is completely burned therein, i.e., at a lower oxygen concentration, and is not completely burned, so that the temperature of combustion is lower, consequently reducing the quantities of NOx to be produced, especially NOx responsible to the nitrogen contained in the RDF.

Combustion gases containing unburned combustibles and the free-flowing medium containing a combustion residue flow into the cyclone 2 from the upper end of the fluidized-bed furnace 1. As in the apparatus of FIG. 4, the medium and combustion residue are separated off and trapped in the cyclone 2 and returned to the furnace 1 through the two branches 3a, 3b of the medium-residue return channel 3. The steam flowing through the superheater 13 is superheated while the medium and residue pass through the branch 3a.

The period of time from the charging of RDF into the furnace 1 until the medium and combustion residue are separated off in the cyclone 2, and the internal temperature of the furnace 1 and the cyclone 2 are so determined that the chlorine contained in the combustion residue of the RDF is thermally removed. More specifically, the time is 1 to 2 seconds, and the temperature is 650 to 800° C. Accordingly, even if the steam flowing through the superheater 13 in the heat recovery unit 12 of the branch 3a has a high temperature, for example, of not lower than 500° C., the corrosion of the superheater 13 at high temperatures can be precluded. As a result, the steam to be sent to a steam turbine can be set at a temperature of at least 500° C., enabling the steam turbine generating plant to achieve a remarkably improved efficiency.

On the other hand, since incineration ash starts to melt at about 800° C., the condition described above obviates the likelihood of molten incineration ash adhering to the interior of the cyclone 2, consequently precluding an impairment in the efficiency of separating the medium and combustion residue from the combustion gases. Further because molten incineration ash is unlikely to adhere to the free-flowing medium, faulty fluidization is avoidable.

The combustion gases egressing from the cyclone 2 flow into the secondary combustion furnace 31, into which tertiary air is introduced to completely burn the unburned combustibles in the gases. In this case, the combustion gases have a temperature of about 850 to about 900° C. and are retained in the furnace for about 2 seconds. This temperature range is low for the formation of NOx from the nitrogen in air, thus serving to inhibit NOx.

The resulting combustion gases flow out of the secondary combustion furnace 31, pass along the heat transfer surfaces of the boiler as in the apparatus of FIG. 4, have their temperature reduced in the temperature reduction column 21, and then flow into the bag filter 22, in which hydrogen chloride, sulfur oxides, soot and dust are removed. The gases are thereafter released into the atmosphere via a stack.

On the other hand, the superheated steam to be fed to the steam turbine is obtained by the same process as in the apparatus of FIG. 4.

FIG. 2 is a plan view of a modified dust collector which is to be disposed downstream from the fluidized-bed furnace 1 for separating the free-flowing medium and combustion residue discharged from the furnace 1 from the combustion gases and trapping these solids.

With reference to FIG. 2, the dust collector 35 comprises a multiplicity of medium collision plates 36 provided inside an unillustrated housing in a staggered arrangement when seen from above. Each plate 36 for the free-flowing medium and combustion residue to collide with is channel-shaped and has an open side facing toward the upstream side with respect to the flow of combustion gases when seen from above. The plate is left open at its upper and lower ends.

In the case of this dust collector 35, the medium and residue striking against the collision plates 36 flow down the plates 36 and are discharged from the lower end of the housing.

FIG. 3 shows the overall construction of a combustion apparatus of the invention for use as an incinerator for burning municipal waste. In FIGS. 3 and 1, like parts are designated by like reference numerals and will not be described repeatedly.

In the case of the combustion apparatus of FIG. 3, the heat recovery column included in the apparatus of FIG. 1 is not disposed between the secondary combustion furnace 31 and the temperature reduction column 21. Further the heat recovery unit 12 of the branch 3a of the medium-residue return channel 3 has a steam generator or like heat exchanger 40 for heat recovery in place of the boiler superheater. The apparatus has none of the components needed for the boiler, i.e., no water tubes along the inner periphery of the fluidized-bed furnace 1, and no steam drum. With the exception of these features, the apparatus has the same construction as the one shown in FIG. 1.

With the combustion apparatus thus constructed, municipal waste placed into the fluidized-bed furnace 1 by the hopper 7 is burned, and the free-flowing medium and combustion residue separated from the combustion gases and trapped in the cyclone 2 are returned to the furnace 1, in the same manner as in the apparatus of FIG. 1.

It will be appreciated that the combustion apparatus of the invention is suitable for use as a boiler wherein RDF is used as the fuel, or as an incinerator for burning municipal waste.

What is claimed is:

1. A combustion apparatus comprising a fluidized-bed furnace having fuel delivery means and a primary combustion air supply means communicating with said fluidized-bed furnace for introducing combustion air to said fluidized-bed furnace in amounts less than that required for achieving complete combustion of the fuel delivered to said furnace a dust collector disposed downstream from the furnace for separating a free-flowing medium and a combustion residue discharged from the furnace from combustion gases and collecting the medium and the residue, a medium -residue return channel provided between the dust collector and the fluidized-bed furnace for returning the free-flowing medium and the combustion residue collected by the dust collector to the furnace therethrough, and a secondary combustion furnace disposed downstream from the dust collector, said secondary combustion furnace having combustion air supply means for introducing combustion air in amounts required for completely burning unburned combustibles in the combustion gases egressing from the dust collector.

2. A combustion apparatus according to claim 1 wherein a heat recovery unit is deposed at an intermediate portion of the medium-residue return channel for recovering heat from the free-flowing medium and the combustion residue collected by the dust collector.

3. A combustion apparatus comprising a fluidized-bed furnace, a dust collector disposed downstream from the furnace for separating a free-flowing medium and a combustion residue discharged from the furnace from combustion gases and collecting the medium and the residue, a medium-residue return channel provided between the dust collector and the fluidized-bed furnace for returning the free-flowing medium and the combustion residue collected by the dust collector to the furnace therethrough, and a secondary combustion furnace disposed downstream from the dust collector for completely burning unburned combustibles in the combustion gases egressing from the dust collector by introducing air into the combustion furnace, wherein a heat recovery unit is disposed at an intermediate portion of the medium-residue return channel for recovering heat from the free-flowing medium and the combustion residue collected by the dust collector, the heat recovery unit being a superheater for a boiler.

* * * * *